US011228239B2

(12) United States Patent
Benabdelaziz et al.

(10) Patent No.: US 11,228,239 B2
(45) Date of Patent: Jan. 18, 2022

(54) DISCHARGE OF AN AC CAPACITOR USING TOTEM-POLE POWER FACTOR CORRECTION (PFC) CIRCUITRY

(71) Applicants: STMicroelectronics (Tours) SAS, Tours (FR); STMicroelectronics LTD, Kowloon (HK)

(72) Inventors: Ghafour Benabdelaziz, Tours (FR); Laurent Gonthier, Taipei (TW)

(73) Assignees: STMicroelectronics (Tours) SAS, Tours (FR); STMicroelectronics LTD, Kowloon (HK)

( * ) Notice: Subject to any disclaimer, the term of this patent is extended or adjusted under 35 U.S.C. 154(b) by 94 days.

(21) Appl. No.: 16/858,907

(22) Filed: Apr. 27, 2020

(65) Prior Publication Data

US 2021/0336533 A1 Oct. 28, 2021

(51) Int. Cl.
*H02M 1/42* (2007.01)
*H02M 7/155* (2006.01)
(Continued)

(52) U.S. Cl.
CPC ....... *H02M 1/4208* (2013.01); *H02M 7/1557* (2013.01); *H02M 7/217* (2013.01); *H02M 1/322* (2021.05)

(58) Field of Classification Search
CPC ....... H02M 1/42; H02M 1/4208–4291; H02M 1/08; H02M 1/083; H02M 1/12;
(Continued)

(56) References Cited

U.S. PATENT DOCUMENTS 4,014,309 A   3/1977 Nagasawa
4,920,301 A   4/1990 Crooks
(Continued)

FOREIGN PATENT DOCUMENTS

EP   2495854 A2   9/2012
EP   2509200 A1   10/2012
(Continued)

OTHER PUBLICATIONS

STMicroelectronics: "Inruch-current limiter circuits (ICL) with Triacs and Thyristors (SCR) and controlled bridge design tips". Mar. 31, 2016 (Mar. 31, 2016), XP055754586.
(Continued)

*Primary Examiner* — Thienvu V Tran
*Assistant Examiner* — Carlos O Rivera-Perez
(74) *Attorney, Agent, or Firm* — Crowe & Dunlevy (57) ABSTRACT

An AC capacitor is coupled to a totem-pole type PFC circuit. In response to detection of a power input disconnection, the PFC circuit is controlled to discharge the AC capacitor. The PFC circuit includes a resistor and a first MOSFET and a second MOSFET coupled in series between DC output nodes with a common node coupled to the AC capacitor. When the disconnection event is detected, one of the first and second MOSFETs is turned on to discharge the AC capacitor with a current flowing through the resistor and the turned on MOSFET. Furthermore, a thyristor may be simultaneously turned on, with the discharge current flowing through a series coupling of the MOSFET, resistor and thyristor. Disconnection is detected by detecting a zero-crossing failure of an AC power input voltage or lack of input voltage decrease or input current increase in response to MOSFET turn on for a DC input.

15 Claims, 7 Drawing Sheets

(51) Int. Cl.
*H02M 7/217* (2006.01)
*H02M 1/32* (2007.01)

(58) Field of Classification Search
CPC ........ H02M 1/126; H02M 1/32; H02M 1/322;
H02M 7/00; H02M 7/02; H02M 7/04;
H02M 7/12; H02M 7/125; H02M 7/145;
H02M 7/155; H02M 7/1557; H02M
7/162; H02M 7/1623; H02M 7/1626;
H02M 7/21; H02M 7/217; H02M 7/2176;
H02M 7/219
USPC .............. 323/205–211, 222–226, 235, 266,
323/271–278, 282–285, 288, 299–303,
323/351, 908; 363/44–48, 50, 52–54,
363/56.12, 57, 58; 361/18; 320/166, 167
See application file for complete search history.

(56) References Cited

U.S. PATENT DOCUMENTS

| | | |
|---|---|---|
| 5,402,058 A | 3/1995 | Larsen |
| 5,872,478 A | 2/1999 | Pounds |
| 6,424,125 B1 | 7/2002 | Graham |
| 8,953,347 B2 | 2/2015 | Jin et al. |
| 9,225,232 B2 | 12/2015 | Liu et al. |
| 9,263,939 B2 | 2/2016 | Jin et al. |
| 9,419,511 B2 | 8/2016 | Huang et al. |
| 9,455,621 B2 | 9/2016 | Lund et al. |
| 9,787,211 B1* | 10/2017 | Schneider ............. H02M 7/217 |
| 9,871,394 B2 | 1/2018 | Ren et al. |
| 10,170,975 B1 | 1/2019 | Feng et al. |
| 10,483,874 B2 | 11/2019 | Benabdelaziz et al. |
| 2011/0025278 A1 | 2/2011 | Balakrishnan et al. |
| 2011/0068751 A1 | 3/2011 | Lin et al. |
| 2011/0101775 A1 | 5/2011 | Busch |
| 2013/0027999 A1 | 1/2013 | Ptacek et al. |
| 2013/0049706 A1 | 2/2013 | Huang et al. |
| 2013/0076315 A1 | 3/2013 | Liu et al. |
| 2013/0188405 A1* | 7/2013 | Jin .......................... H02M 1/32 363/49 |
| 2016/0373021 A1 | 12/2016 | Gonthier |
| 2017/0170746 A1 | 6/2017 | Benabdelaziz et al. |
| 2017/0187217 A1 | 6/2017 | Gong et al. |
| 2017/0346325 A1 | 11/2017 | Ohtake |
| 2019/0006959 A1* | 1/2019 | Benabdelaziz ....... H02M 7/757 |
| 2019/0222136 A1 | 7/2019 | Gonthier et al. |

FOREIGN PATENT DOCUMENTS

| | | |
|---|---|---|
| EP | 3096456 A1 | 11/2016 |
| FR | 3037741 A1 | 12/2016 |

OTHER PUBLICATIONS

Zhou, Liang et al: "99% Efficiency True-Bridgeless Totem-Pole PFC Based on GaN HEMTs," 2015, 9 pages.

* cited by examiner

DISCHARGE OF AN AC CAPACITOR USING TOTEM-POLE POWER FACTOR CORRECTION (PFC) CIRCUITRY

TECHNICAL FIELD

The present disclosure generally concerns electronic circuits and more particularly circuits configured to be coupled to an AC voltage source, such as the electric power distribution mains. The present disclosure more particularly applies to circuits comprising an AC capacitor.

BACKGROUND

In many applications, the power received from the electric power distribution mains by devices connected thereto is filtered by a capacitor (such as an AC capacitor) upstream of a voltage conversion and/or power factor correction circuit. The capacitor, for example, is generally directly connected to the line and neutral conductors (or between two phases) of the AC power supply, or alternatively directly connected to lines of a DC power supply.

The presence of the capacitor requires discharging it when the device is disconnected from the power supply network by the user. Indeed, the charge that is stored by the capacitor at the time when the device is disconnected can be quite high and presents a significant danger to the user.

Although many solutions exist for this problem, they are often complex and/or expensive. There is a need in the art for a simple and inexpensive AC capacitor discharge circuit.

SUMMARY

In an embodiment, a circuit comprises: a first capacitor having first and second electrodes respectively coupled to first and second power supply input nodes; a first switching transistor having a conduction path coupled between the first power supply input node and a first DC node; a second switching transistor having a conduction path coupled between the first power supply input node and a second DC node; a first thyristor having a conduction path coupled between the second power supply input node and the first DC node; a second thyristor having a conduction path coupled between the second power supply input node and the second DC node; a resistor coupled between the second power supply input node and an intermediate node; a first diode having a conduction path coupled between the intermediate node and the first DC node; a second diode having a conduction path coupled between the intermediate node and the second DC node; and a control circuit configured to sense a disconnection of input power to the first and second power supply input nodes and in response thereto turn on one of the first and second switching transistors to discharge the first capacitor through the resistor.

In an embodiment, a circuit comprises: a first capacitor having first and second electrodes respectively coupled to first and second power supply input nodes; a first switching transistor having a conduction path coupled between the first power supply input node and a first DC node; a second switching transistor having a conduction path coupled between the first power supply input node and a second DC node; a first thyristor having a conduction path coupled between the second power supply input node and the first DC node; a second thyristor having a conduction path coupled between the second power supply input node and the second DC node; a resistor coupled between the second power supply input node and an intermediate node; a third thyristor having a conduction path coupled between the intermediate node and the first DC node; a fourth thyristor having a conduction path coupled between the intermediate node and the second DC node; and a control circuit configured to sense a disconnection of input power to the first and second power supply input nodes and in response thereto turn on one of the first and second switching transistors and one of the third and fourth thyristors to discharge the AC capacitor through the resistor.

In an embodiment, a circuit comprises: a first capacitor having first and second electrodes respectively coupled to first and second power supply input nodes; a first switching transistor having a conduction path coupled between the first power supply input node and a first DC node; a second switching transistor having a conduction path coupled between the first power supply input node and a second DC node; a first thyristor having a conduction path coupled between the second power supply input node and the first DC node; a second thyristor having a conduction path coupled between the second power supply input node and the second DC node; a first resistor and a third thyristor having a conduction path coupled in series between the second power supply input node and the first DC node; a second resistor and a fourth thyristor having a conduction path coupled in series between the second power supply input node and the second DC node; and a control circuit configured to sense a disconnection of an AC input to the first and second AC nodes and in response thereto turn on one of the first and second switching transistors and one of the third and fourth thyristors to discharge the AC capacitor through one of the first and second resistors coupled in series with said one of the third and fourth thyristors.

BRIEF DESCRIPTION OF THE DRAWINGS

The foregoing and other features and advantages will be discussed in detail in the following non-limiting description of specific embodiments in connection with the accompanying drawings, in which.

DETAILED DESCRIPTION

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed. In particular, the DC/AC or DC/DC power converter powered by the described circuit as well as the control of such a power converter have not been detailed, the described embodiments being compatible with usual converters and usual controls of such converters.

Throughout the present disclosure, the term "connected" is used to designate a direct electrical connection between circuit elements with no intermediate elements other than conductors, whereas the term "coupled" is used to designate an electrical connection between circuit elements that may be direct, or may be via one or more intermediate elements.

The terms "about", "substantially", and "approximately" are used herein to designate a tolerance of plus or minus 10%, preferably of plus or minus 5%, of the value in question.

Figure 1:
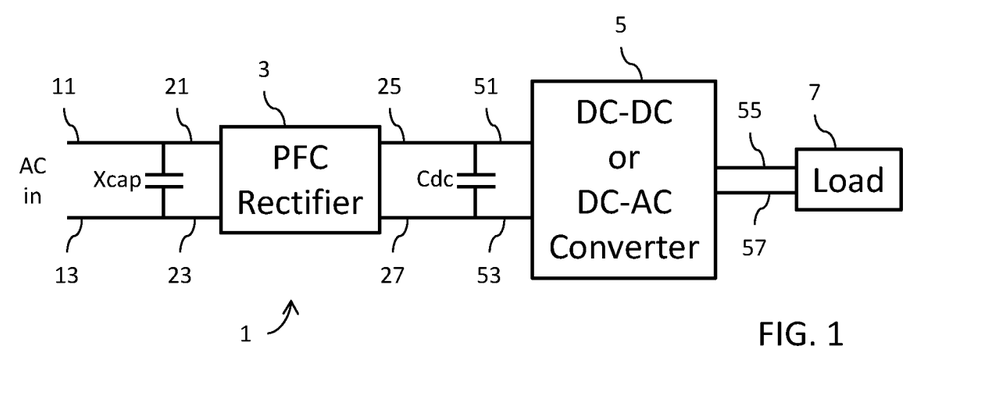
FIG. 1 shows an example of a power conversion system.

FIG. 1 shows an example of a power conversion system 1. Such a conversion system 1 is based on a halfwave or fullwave rectification and power factor correction (PFC) of an AC power supply voltage Vac, followed by a DC/DC or DC/AC conversion to power a load.

Schematically, AC voltage Vac is applied between two input terminals 11 (L—line) and 13 (N—neutral) coupled to AC input terminals 21 and 23 of a power factor correction (PFC) rectifier circuit 3. Voltage Vac is, for example, the AC voltage or mains voltage of a 230V/50 Hz or 60 Hz, or 110V/50 Hz or 60 Hz power distribution network. Typically, terminals 11 and 13 are formed of pins of a plug of connection of system 1 to a socket of an electrical installation.

Output terminals 25 and 27 of the PFC rectifier circuit 3 are coupled to input terminals 51 and 53 of a DC/DC or DC/AC conversion circuit 5. Output terminals 55 and 57 (DC or AC according to the embodiment) of circuit 5 provide a power supply voltage to a load 7. A DC capacitor Cdc couples, preferably connects, terminals 25 and 27 to smooth the rectified voltage and deliver a rectified voltage at the input of circuit 5. Converter 5 is preferably a switched-mode power supply controlled at a frequency much higher (by a ratio in the order of from 1,000 to 10,000) than the frequency of voltage Vac.

In the applications targeted by the present disclosure, a capacitor (referred to as an AC capacitor) Xcap couples, preferably connects, power supply terminals 11 and 13 upstream of any element of conversion system 1 and in particular upstream of the PFC rectifier circuit 3. The function of capacitor Xcap is to filter AC voltage Vac, particularly to remove possible high-frequency disturbances (at a frequency greater than the frequency of AC voltage Vac).

The presence of the AC capacitor Xcap at the power supply input requires discharging this capacitor for user safety reasons when the system is disconnected from the electrical installation (i.e., the power mains, AC or DC) in case of a contact being made by the user with terminals 11 and 13 when the system is disconnected.

Many solutions to discharge the AC capacitor in response to disconnection from the AC input voltage are known in the art.

A first category of solutions uses passive components, with capacitor Xcap then forming part of an AC filter having a resistor of low value connected in parallel with the capacitor and dissipating the power that it contains when the system is disconnected. A disadvantage of such a solution is that permanent power dissipation exists in the application.

A second category of solutions uses active components to control a discharge of the AC capacitor when power supply voltage Vac disappears. Such solutions generally require additional circuits and components which increase the cost of the system or of the application.

According to the described embodiments herein, it is provided to take advantage of a specific circuit structure present within the PFC rectifier circuit 3 to support the capacitor discharge operation.

Figure 2:
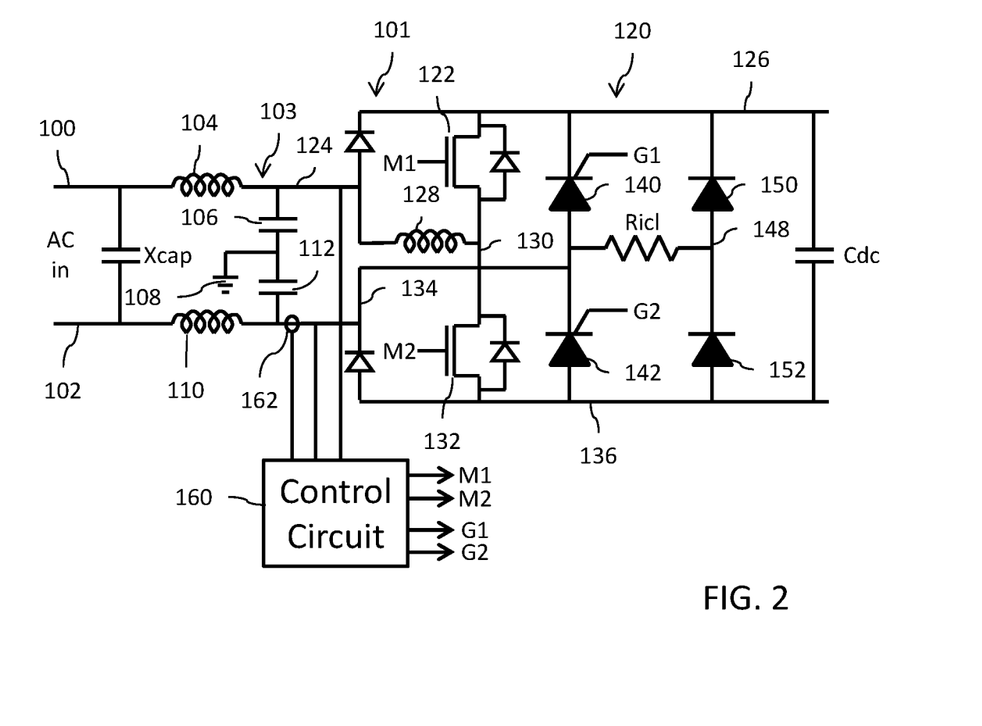
FIG. 2 schematically shows an embodiment of a power conversion system or circuit equipped with an AC capacitor discharge function.

Reference is now made to FIG. 2 which schematically shows an embodiment of a power conversion system or circuit 101 equipped with an AC capacitor discharge function. An AC power supply voltage Vac is applied to input terminals 100 and 102. A capacitor (for example, the AC (input) capacitor) Xcap is coupled, preferably connected, to and between input terminals 100 and 102, perhaps as part of a filter circuit 103 which also includes an inductor 104 and a capacitor 106 coupled in series between terminal 100 and a ground node 108, and an inductor 110 and a capacitor 112 coupled in series between terminal 102 and the ground node 108. A PFC rectifier circuit 120 of the totem-pole type includes a first transistor switch 122 (for example, of the n-channel MOSFET type) having a source-drain path coupled between an input node 124 (at the series connection of inductor 104 and capacitor 106) and a first rectified output node 126. The PFC rectifier circuit 120 further includes a second transistor switch 132 (for example, of the n-channel MOSFET type) having a source-drain path coupled between the input node 124 and a second rectified output node 136. Each of the transistors 122 and 132 includes an intrinsic body diode as shown. An external diode could be added in some cases in reverse parallel of each of the transistors 122 and 132. The PFC rectifier circuit 120 further includes a first thyristor 140 (for example, of the cathode-gated type) having a conduction path coupled between the input node 134 (at the series connection of inductor 110 and capacitor 112) and the first rectified output node 126, and a second thyristor 142 (for example, of the cathode-gated type) having a conduction path coupled between the input node 134 and the second rectified output node 136. A differential mode inductor 128 has a first terminal connected to node 124 and a second terminal connected to node 130 at the series connection of transistors 122 and 132. A surge protection diode may be provided between nodes 124 and 126 and a surge protection diode may be provided between nodes 134 and 136. An in-rush current limiting resistor Rid (for example, of the negative temperature current (NTC) type) is connected to and between the input node 134 at the series connection of thyristors 140 and 142 and an intermediate node 148. The PFC rectifier circuit 120 further includes a first diode 150 having a conduction path coupled between the intermediate node 148 and the first rectified output node 126, and a second diode 152 having a conduction path coupled between the intermediate node 148 and the second rectified output node 136. A DC capacitor Cdc couples, preferably connects, rectified output nodes 126 and 136 to smooth the rectified voltage and deliver a rectified voltage to downstream circuits (for example, at lines 51, 53 to a converter circuit 5 as shown in FIG. 1). The control signals M1 and M2 for driving the gates of the first and second transistor switches 122 and 132, respectively, are generated by a control circuit 160. The control circuit 160 further generates the control signals G1 and G2 which drive the cathode gates of the first and second thyristors 140 and 142, respectively. The control circuit 160 includes inputs for sensing the voltage at input nodes 124 and 134, and further includes an input for sensing AC current flow using a current sensor 162 coupled to sense current flowing from or to the power supply (for example, AC input) terminals 100, 102.

Figure 7:
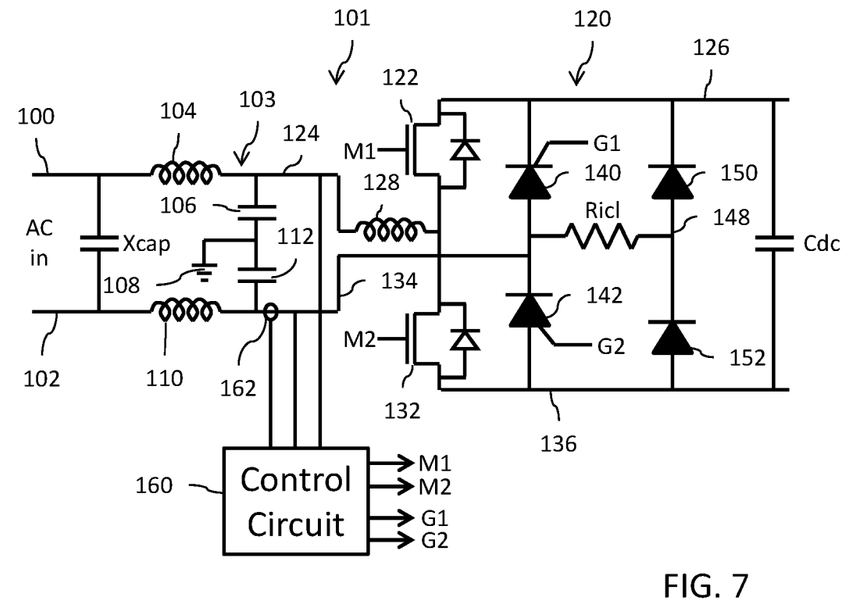
FIG. 7 shows an alternate thyristor gating configuration for the circuit of FIG. 2.

Although the first and second thyristors 140 and 142 are shown in FIG. 2 as both being cathode-gates devices, the second thyristor 142 could instead be an anode-gated device as shown in FIG. 7. Furthermore, the MOSFET devices used for the switching transistors can be implemented in any suitable technology (including, without limitation, the use of silicon or high-gap materials such as SiC or GaN).

Figure 3:
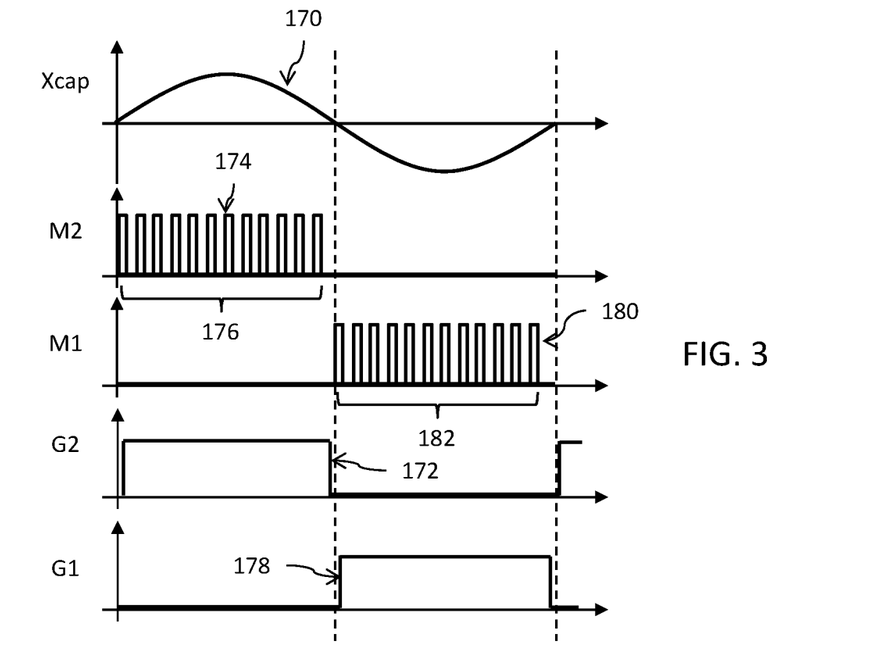
FIG. 3 shows waveforms for the operation of the PFC rectifier circuit in normal mode.

FIG. 3 shows waveforms for the operation of the PFC rectifier circuit 120. Waveform 170 is the voltage across the AC capacitor Xcap that is sensed by the control circuit 160 at input nodes 124 and 134. In a normal operating mode, the sinusoidal shape of waveform 170 is indicative of the receipt of the AC power supply voltage Vac as applied to input terminals 100 and 102.

During a positive phase of the AC power supply voltage Vac, the control circuit 160 generates the signal G2 (reference 172) to cause the second thyristor 142 to turn on (with the first thyristor 140 controlled to be turned off) and generates the signal M2 with pulses at a high frequency (reference 174, for example, with a pulse width modulation (PWM)), to control turning on/off of the second transistor switch 132 (with the first transistor switch 122 turned off). The signal G2 is generated by the control circuit 160 for a duration of time sufficient to ensure that the second thyristor 142 is turned on for substantially the entire duration of the positive phase of the AC power supply voltage Vac (and for at least as long as the conduction period (duration 176) of the pulses for signal M2). In an alternative implementation, the signal G2 need only be a pulse of sufficient duration to cause the second thyristor 142 to turn on in forward conduction mode up to its current exceeding the latching current value, then the second thyristor 142 will remain in the on state until the current passing through the conduction path falls below the holding current value of the device.

With respect to the positive phase of the AC power supply voltage Vac, when second transistor switch 132 is turned on in response to the pulsed signal M2 generated by the control circuit 160, inductor current flows from node 124 through turned on transistor switch M2, then through turned on second thyristor 142 to node 134. When second transistor switch 132 is turned off in response to the pulsed signal M2, inductor current flows from node 124 through the freewheeling body diode of transistor switch 122 (which is turned off by signal M1) to charge capacitor Cdc and return through turned on second thyristor 142 to node 134. Signal M1 could also be activated during this period (after a dead-time to avoid transistors 122 and 132 to be conducting in forward direction at the same time) to ensure the reverse conduction of the transistor 122 channel and reduce its conduction losses.

During a negative phase of the AC power supply voltage Vac, the control circuit 160 generates the signal G1 (reference 178) to cause the first thyristor 140 to turn on (with the second thyristor 142 controlled to be turned off) and generates the signal M1 with a pulsed signal at a high frequency (reference 180, for example, with a pulse width modulation (PWM)), to control turning on/off of the first transistor switch 122 (with the second transistor switch 132 turned off). The signal G1 is generated by the control circuit 160 to ensure that the first thyristor 140 is turned on for substantially the entire duration of the negative phase of the AC power supply voltage Vac (and for at least as long as the conduction period (duration 182) of the pulses for signal M1). In an alternative implementation, the signal G1 need only be a pulse of sufficient duration to cause the first thyristor 140 to turn on in forward conduction mode up to its current exceeding the latching current value, then the first thyristor 140 will remain in the on state until the current passing through the conduction path falls below the holding current value of the device.

With respect to the negative phase of the AC power supply voltage Vac, when the first transistor switch 122 is turned on in response to the pulsed signal M1 generated by the control circuit 160, inductor current flows from node 134 through turned on first thyristor 140, then through turned on transistor switch M1 to node 124. When first transistor switch 122 is turned off in response to the pulsed signal M2, inductor current flows from node 134 through turned on first thyristor 140 to charge capacitor Cdc and return through the freewheeling body diode of transistor switch 132 (which is turned off by signal M2) to node 124. Signal M2 could also be activated during this period (after a dead-time to avoid transistors 122 and 132 to be conducting in forward direction at the same time) to ensure the reverse conduction of the transistor 132 channel and reduce its conduction losses.

The current sensed by current sensor 162 is used by the control circuit 160 to control the conduction periods 182 and 176 of the first and second transistor switches 122 and 132, respectively.

The pulse frequency of the signals M1 and M2 is generally fixed by a PWM clock and is typically higher by a factor of at least 100 than the frequency of the AC power supply voltage Vac.

Consider now the operating scenario where the circuit 101 is disconnected from the input power supply (for example, from AC power supply voltage Vac) applied to input terminals 100 and 102. The charge on the AC capacitor Xcap needs to be discharged and the circuit 101 includes an AC capacitor discharge function using the circuitry of the PFC circuit itself to accomplish this goal. The control circuit 160 can sense the disconnection of the circuit 101 from the power supply (for example, the AC power supply voltage Vac) by monitoring the voltage at the input nodes 124 and 134. If that sensed voltage at input nodes 124 and 134 fails to zero-cross (i.e., the voltage difference between input nodes 124 and 134 does not fall to zero), this is indicative of the occurrence of a disconnection of the AC power supply voltage Vac. In response to sensing the disconnection event, the control circuit will selectively turn on one of the transistor switches 122 or 132 of the PFC circuit, depending on polarity of the voltage across AC capacitor Xcap, in order to discharge the stored charge. The control circuit 160 will continue to monitor the voltage difference between input nodes 124 and 134 and when that difference falls to zero the previously turned on transistor switch 122 or 132 will be turned off.

In an alternative embodiment, at first plug-in of the converter, the control circuit may sense the rising edge (or falling edge) of the supply voltage. Then, in the case where the voltage between input nodes 124 and 134 does not fall to zero and in the case if after one of the transistor 122 and 132 is turned on and that the current sensor senses enough current increase and/or that the voltage between input nodes 124 and 134 does not collapse (after transistors 122 and 132 are turned on), the control circuit may interpret this information as the converter having been plugged in to a DC voltage network to receive a DC supply voltage). The Xcap discharge function will then be ensured (in case operation under DC voltage network is assumed) once the inductor current does not increase (to a certain degree, for example, anymore) or, in case where the PFC circuit is not activated (for example delayed) repetitively at low-frequency (for example 1 Hz or lower) to ensure safety while not dissipating too much energy. Or, the above sequence (which is activated at first plug-in) will be repeated at the same frequency to detect whether the DC supply voltage is still present.

For example, in the event of a disconnection (FIG. 4A, reference 190, time td) where the polarity of the voltage across AC capacitor Xcap is positive (i.e., powered off under a positive halfwave with the conventions taken in the drawings), the control circuit 160 will detect through monitoring of the voltage at input nodes 124 and 134 that no zero-cross occurs (FIG. 4A, reference 192; or alternatively that there is a DC supply disconnection as discussed above) within a certain time period (FIG. 4A, reference 194, from time td to time t1), wherein the certain time period may, for example, be in the range of one AC cycle up to about 1-3 seconds. In response to detection of the disconnection event, the control circuit 160 asserts the signal M2 (FIG. 4A, reference 196, at time t1) to turn on the second transistor switch 132. The voltage across the AC capacitor Xcap is discharged (FIG. 4A, reference 198) by a capacitor discharge current that flows from node 100 at the positive terminal of AC capacitor Xcap through inductor 104 to input node 124, then through turned on second transistor switch 132 to forward bias and flow through second diode 152 to node 148, then through resistor Ricl to node 134, and then through inductor 110 to node 102 at the negative terminal of AC capacitor Xcap. The control circuit 160 turns on the second transistor switch 132 through assertion of signal M2 for a length of time (FIG. 4A, reference 200, time t1 to time t2) that is sufficient to ensure full discharge of the AC capacitor Xcap. The time period 200 will, for example, extend for a duration equal to many cycles of the PWM clock and, in particular, may be equal to about one-quarter of the period up to about few periods of the AC power supply voltage Vac. When the control circuit 160 detects that the voltage difference between input nodes 124 and 134 falls to zero, the signal M2 is preferably deasserted to turn off transistor switch 132.

Conversely, in the event of a disconnection (FIG. 4B, reference 190, time td) where the polarity of the voltage across AC capacitor Xcap is negative (i.e., powered off under a negative halfwave with the conventions taken in the drawings), the control circuit 160 will detect through monitoring of the voltage at input nodes 124 and 134 that no zero-cross occurs (FIG. 4B, reference 192; or alternatively that there is a DC supply disconnection as discussed above) within a certain time period (FIG. 4B, reference 194, from time td to time t1), wherein the certain time period may, for example, be in the range of one AC cycle up to about 1-3 seconds. In response thereto, the control circuit 160 asserts the signal M1 (FIG. 4B, reference 196, at time t1) to turn on the first transistor switch 122. The voltage across the AC capacitor Xcap is discharged (FIG. 4B, reference 198) by a capacitor discharge current that flows from node 102 at the negative terminal of AC capacitor Xcap through inductor 110 to input node 134, then through resistor Rid to node 148, to forward bias and flow through first diode 150, then through turned on first transistor switch 122 to node 124, and then through inductor 104 to node 100 at the positive terminal of AC capacitor Xcap. The control circuit 160 turns on the first transistor switch 122 through assertion of signal M1 for a length of time (FIG. 4B, reference 200, time t1 to time t2) that is sufficient to ensure full discharge of the AC capacitor Xcap. The time period 200 will, for example, extend for a duration equal to many cycles of the PWM clock and, in particular, may be equal to about one-quarter of the period up to about few periods of the AC power supply voltage Vac. When the control circuit 160 detects that the voltage difference between input nodes 124 and 134 falls to zero, the signal M1 is deasserted to turn off transistor switch 122.

Figure 4A:
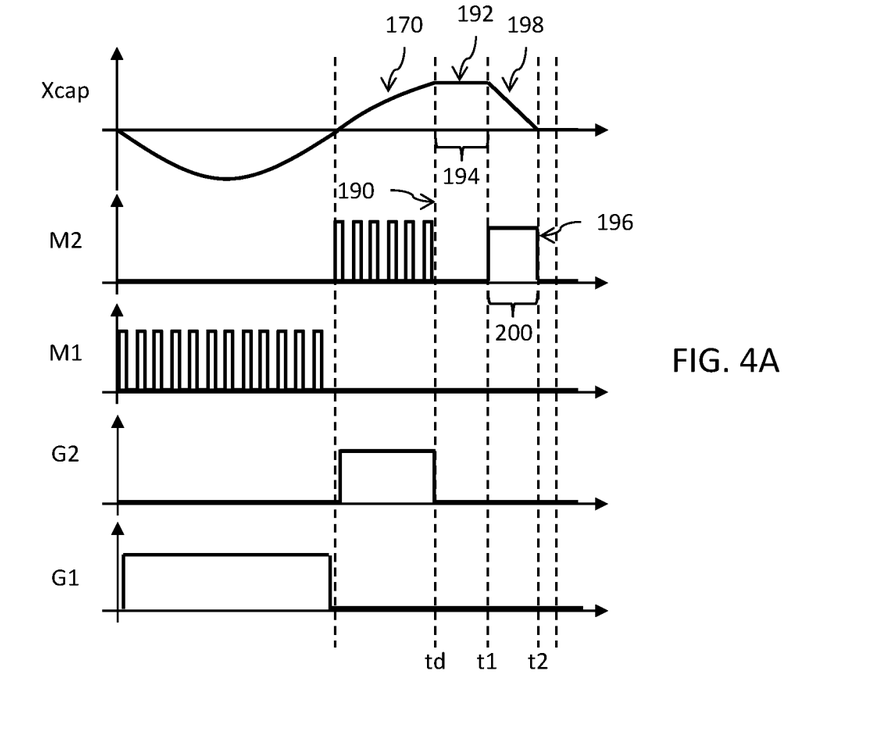
FIGS. 4A and 4B show waveforms for the operation of the PFC rectifier circuit in detecting and responding to a disconnection of an AC input voltage by discharging an AC capacitor.
Figure 4B:
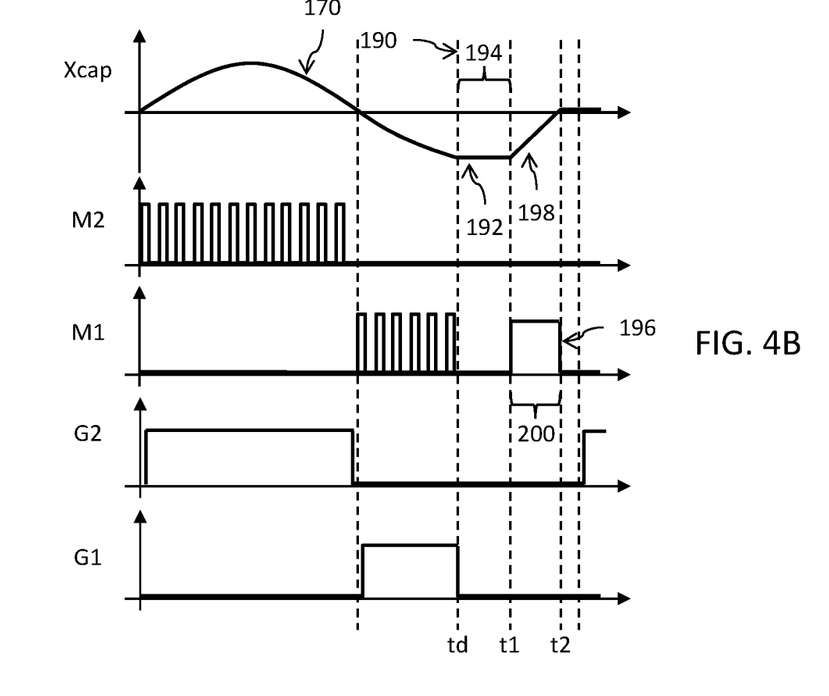

Thus, the capacitor Xcap discharges using the selectively actuated MOSFET of the totem-pole PFC circuit, its power being discharged by dissipation into the resistance of resistor Rid and possibly the intrinsic resistance of the inductors 104 and 110. Although the resistances are small, they are nonetheless sufficient to discharge capacitor Xcap. In practice, a current flow of a few milliamperes is sufficient to sufficiently rapidly discharge (within from a few milliseconds to a few tens of milliseconds) the capacitor Xcap.

Figure 5:
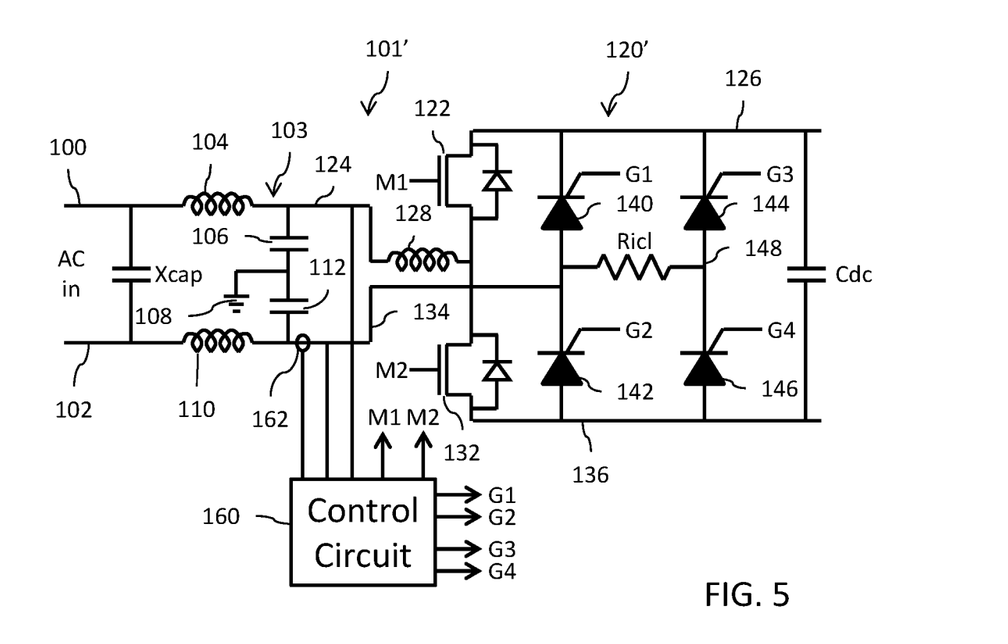
FIG. 5 schematically shows an embodiment of a power conversion system or circuit equipped with an AC capacitor discharge function.

Reference is now made to FIG. 5 which schematically shows an embodiment of a power conversion system or circuit 101' equipped with an AC capacitor discharge function. Like reference numbers refer to same or similar parts. The circuit 101' differs from the circuit 101 of FIG. 2 in that the first and second diodes 150 and 152 have been replaced with third and fourth thyristors 144 and 146, respectively, in the PFC rectifier circuit 120'. Specifically, the PFC rectifier circuit 120 includes a third thyristor 144 (for example, of the cathode-gated type) having a conduction path coupled between the intermediate node 148 and the first rectified output node 126, and a fourth thyristor 146 (for example, of the cathode-gated type) having a conduction path coupled between the intermediate node 148 and the second rectified output node 136. The control circuit 160 further generates the control signals G3 and G4 which drive the cathode gates of the third and fourth thyristors 144 and 146, respectively.

FIG. 3 shows waveforms for the operation of the PFC rectifier circuit 120' in normal mode. There is no difference in operation in comparison to the PFC rectifier circuit 120 in FIG. 2.

Figure 6A:
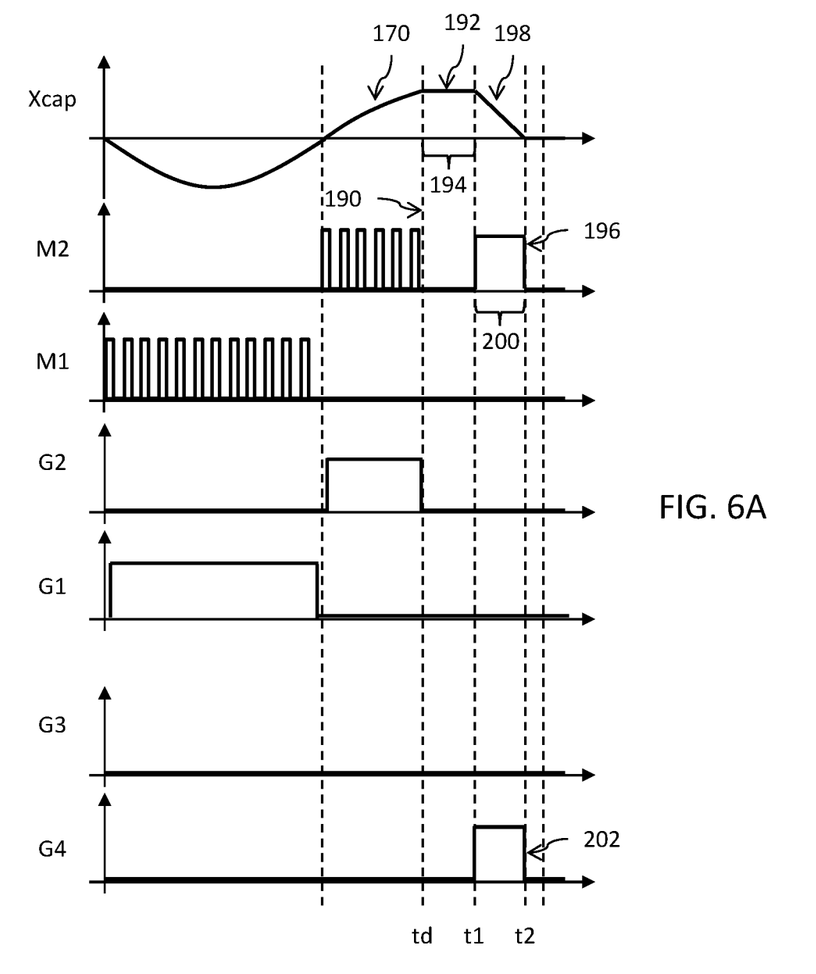
FIGS. 6A and 6B show waveforms for the operation of the PFC rectifier circuit in detecting and responding to a disconnection of an AC input voltage by discharging an AC capacitor.
Figure 6B:
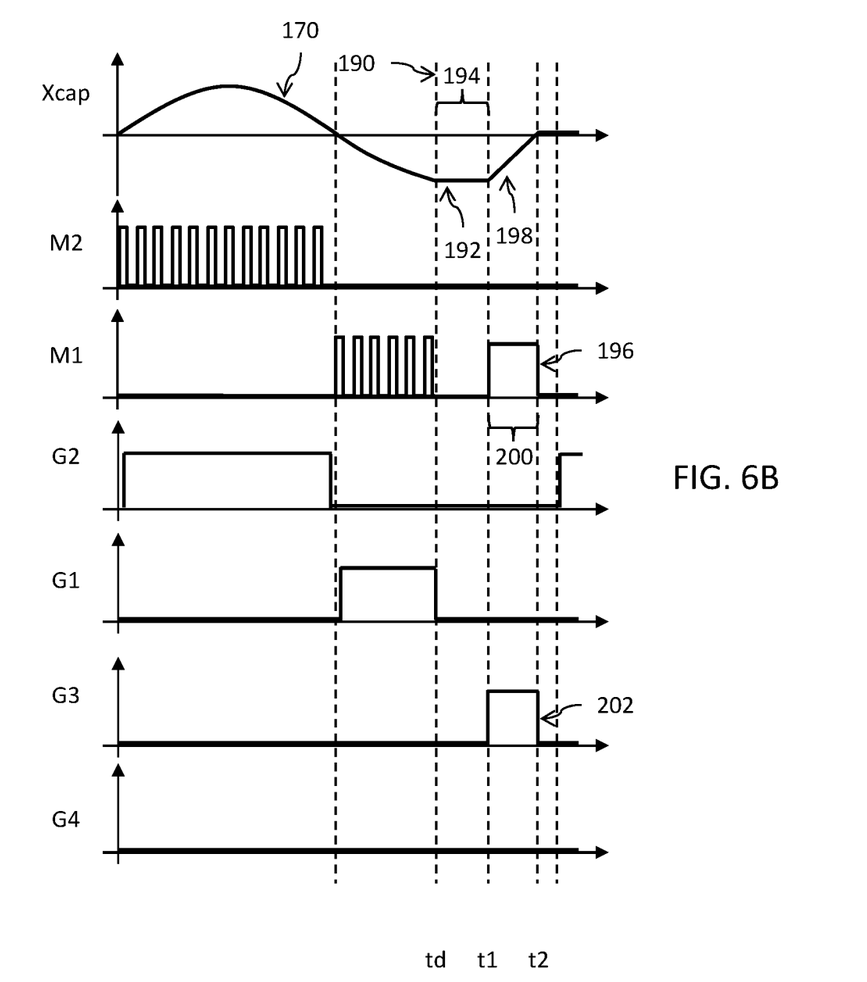

FIGS. 6A and 6B show waveforms for the operation of the PFC rectifier circuit 120' in detecting and responding to a disconnection of an AC input voltage by discharging an AC capacitor. There is a difference in operation here as compared to FIGS. 4A-4B and the circuit 101 of FIG. 2.

When the circuit 101' is disconnected from the AC power supply voltage Vac applied to input terminals 100 and 102, the charge on the AC capacitor Xcap needs to be discharged and the circuit 101' includes an AC capacitor discharge function using the circuitry of the PFC circuit itself to accomplish this goal. The control circuit 160 can sense the disconnection of the circuit 101 from the AC power supply voltage Vac (or alternatively that there is a DC supply disconnection as discussed above) by monitoring the voltage at input nodes 124 and 134. If that sensed voltage at input nodes 124 and 134 fails to zero-cross (i.e., the voltage difference between input nodes 124 and 134 does not fall to zero), this is indicative of the occurrence of a disconnection of the AC power supply voltage Vac (or DC supply). In response to sensing the disconnection event, the control circuit will selectively turn on one of the transistor switches 122 or 132 along with simultaneously turning on one of the third and fourth thyristors 144 or 146, depending on polarity of the voltage across AC capacitor Xcap, in order to discharge the stored charge. The control circuit 160 will continue to monitor the voltage difference between input nodes 124 and 134 and when that difference falls to zero the previously turned on transistor switch 122 or 132 and previously turned on thyristor 144 or 146 will be turned off.

For example, in the event of a disconnection (FIG. 6A, reference 190, time td) where the polarity of the voltage across AC capacitor Xcap is positive (i.e., powered off under a positive halfwave with the conventions taken in the drawings), the control circuit 160 will detect through monitoring of the voltage at input nodes 124 and 134 that no zero-cross occurs (FIG. 6A, reference 192; or alternatively that there is a DC supply disconnection as discussed above) within a certain time period (FIG. 6A, reference 194, from time td to time t1), wherein the certain time period may, for example, be in the range of one AC cycle up to about 1-3 seconds. In response thereto, the control circuit 160 asserts the signal M2 (FIG. 6A, reference 196, at time t1) to turn on the second transistor switch 132 and simultaneously asserts the signal G4 (FIG. 6A, reference 202, at time t1) to turn on the fourth thyristor 146. Note: the signal G4 could be a pulse of duration sufficiently long enough to reach the latching current of the thyristor, but applying a longer pulse as shown ensures that the thyristor remains on even below the holding current so as to ensure full discharge of the capacitor. The voltage across the AC capacitor Xcap is discharged (FIG. 6A, reference 198) by a capacitor discharge current that flows from node 100 at the positive terminal of AC capacitor Xcap through inductor 104 to input node 124, then through turned on second transistor switch 132 and through turned on fourth thyristor 146 to node 148, then through resistor Rid to node 134, and then through inductor 110 to node 102 at the negative terminal of AC capacitor Xcap. The control circuit 160 simultaneously turns on the second transistor switch 132 through assertion of signal M2 and the fourth thyristor 146 through assertion of signal G4 for a length of time (FIG. 6A, reference 200, time t1 to time t2) that is sufficient to ensure full discharge of the AC capacitor Xcap. The time period 200 will, for example, extend for a duration equal to many cycles of the PWM clock and, in particular, may be equal to about one-quarter of the period up to about few periods of the AC power supply voltage Vac. When the control circuit 160 detects that the voltage difference between input nodes 124 and 134 falls to zero, the signals M2 and G4 are deasserted to turn off transistor switch 132 and thyristor 146.

Conversely, in the event of a disconnection (FIG. 6B, reference 190, time td) where the polarity of the voltage across AC capacitor Xcap is negative (i.e., powered off under a negative halfwave with the conventions taken in the drawings), the control circuit 160 will detect through monitoring of the voltage at input nodes 124 and 134 that no zero-cross occurs (FIG. 6B, reference 192; or alternatively that there is a DC supply disconnection as discussed above) within a certain time period (FIG. 6B, reference 194, from time td to time t1), wherein the certain time period may, for example, be in the range of one AC cycle up to about 1-3 seconds. In response thereto, the control circuit 160 asserts the signal M1 (FIG. 6B, reference 196, at time t1) to turn on the first transistor switch 122 and simultaneously asserts the signal G3 (FIG. 6B, reference 202, at time t1) to turn on the third thyristor 144. Note: the signal G3 could be a pulse of duration sufficiently long enough to reach the latching current of the thyristor, but applying a longer pulse as shown ensures that the thyristor remains on even below the holding current so as to ensure full discharge of the capacitor. The voltage across the AC capacitor Xcap is discharged (FIG. 6B, reference 198) by a capacitor discharge current that flows from node 102 at the negative terminal of AC capacitor Xcap through inductor 110 to input node 134, then through resistor Rid to node 148, then through turned on third thyristor 144 and turned on first transistor switch 122 to node 124, and then through inductor 104 to node 100 at the positive terminal of AC capacitor Xcap. The control circuit 160 simultaneously turns on the first transistor switch 122 through assertion of signal M1 and the third thyristor 144 through assertion of signal G3 for a length of time (FIG. 6B, reference 200, time t1 to time t2) that is sufficient to ensure full discharge of the AC capacitor Xcap. The time period 200 will, for example, extend for a duration equal to many cycles of the PWM clock and, in particular, may be equal to about one-quarter of the period up to about few periods of the AC power supply voltage Vac. When the control circuit 160 detects that the voltage difference between input nodes 124 and 134 falls to zero, the signals M1 and G3 are deasserted to turn off transistor switch 122 and thyristor 144.

Thus, the capacitor Xcap discharges using the selectively actuated MOSFET of the totem-pole PFC circuit, its power being discharged by dissipation into the resistances of resistor Rid, the actuated thyristor 144 or 146 and possibly the intrinsic resistance of the inductors 104 and 110. Although the resistances are small, they are nonetheless sufficient to discharge capacitor Xcap. In practice, a current flow of a few milliamperes is sufficient to sufficiently rapidly discharge (within from a few milliseconds to a few tens of milliseconds) the capacitor Xcap.

Figure 8:
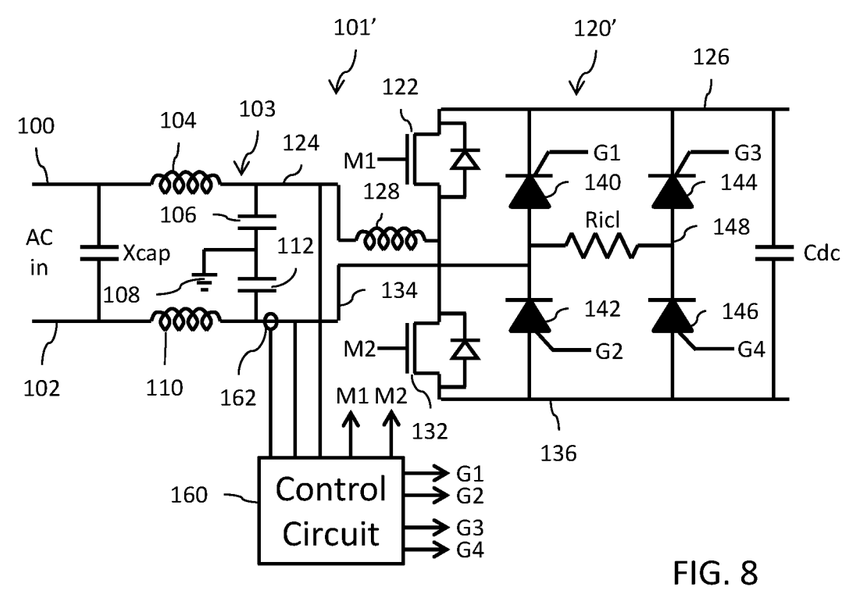
FIG. 8 shows an alternate thyristor gating configuration for the circuit of FIG. 5 (as well as for the circuit of FIG. 9)

Although the first, second, third and fourth thyristors 140, 142, 144, 146 are shown in FIG. 5 as being cathode-gates devices, the second and fourth thyristors 142 and 146 could instead be anode-gated devices as shown in FIG. 8.

Figure 9:
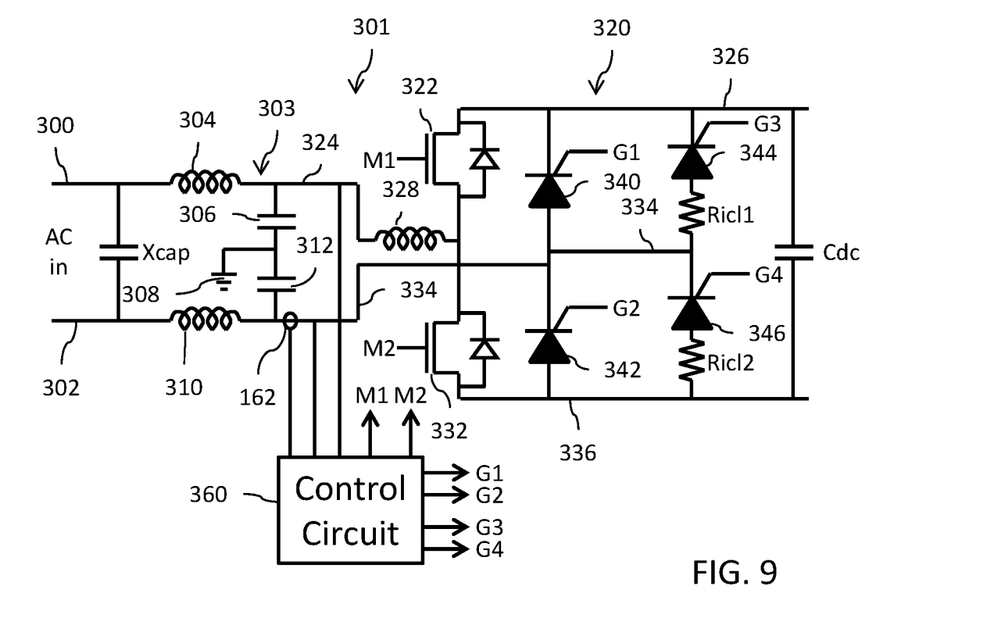
FIG. 9 schematically shows an embodiment of a power conversion system or circuit equipped with an AC capacitor discharge function.

Reference is now made to FIG. 9 which schematically shows an embodiment of a power conversion system or circuit 301 equipped with an AC capacitor discharge function. An AC power supply voltage Vac is applied to input terminals 300 and 302. An AC capacitor Xcap is coupled, preferably connected, to and between the terminals 300 and 302 as part of a filter circuit 303 which also includes an inductor 304 and a capacitor 306 coupled in series between the terminal 300 and a ground node 308, and an inductor 310 and a capacitor 312 coupled in series between the terminal 302 and the ground node 308. A PFC rectifier circuit 320 of the totem-pole type includes a first transistor switch 322 (for example, of the n-channel MOSFET type) having a source-drain path coupled between the input node 324 (at the series connection of inductor 304 and capacitor 306) and a first rectified output node 326. The PFC rectifier circuit 320 further includes a second transistor switch 332 (for example, of the n-channel MOSFET type) having a source-drain path coupled between the input node 324 and a second rectified output node 336. Each of the transistors 322 and 332 includes an intrinsic body diode as shown. An external diode could be added in some cases in reverse parallel of each of the transistors 322 and 332. The PFC rectifier circuit 320 further includes a first thyristor 340 (for example, of the cathode-gated type) having a conduction path coupled between the input node 334 (at the series connection of inductor 310 and capacitor 312) and the first rectified output node 326, and a second thyristor 342 (for example, of the cathode-gated type) having a conduction path coupled between the input node 334 and the second rectified output node 336. The PFC rectifier circuit 320 still further includes a third thyristor 344 (for example, of the cathode-gated type) having a conduction path coupled, preferably connected, in series with a first rush current limiting resistor Ricl1 (for example, of the negative temperature current (NTC) type) between the input node 334 (at the series connection of inductor 310 and capacitor 312) and the first rectified output node 326, and a fourth thyristor 346 (for example, of the cathode-gated type) having a conduction path coupled, preferably connected, in series with a second rush current limiting resistor Ricl2 (for example, of the negative temperature current (NTC) type) between the input node 334 and the second rectified output node 336. A differential mode inductor 328 has a first terminal connected to node 324 and a second terminal connected to node 330 at the series connection of transistors 322 and 332. Surge protection diodes (not shown, see FIG. 2) may be provided between nodes 324 and 326 and between nodes 334 and 336. A DC capacitor Cdc couples, preferably connects, rectified output nodes 326 and 336 to smooth the rectified voltage and deliver a rectified voltage to downstream circuits (for example, a converter circuit 5 as shown in FIG. 1). The control signals M1 and M2 for driving the gates of the first and second transistor switches 322 and 332, respectively, are generated by a control circuit 360. The control circuit 360 further generates the control signals G1, G2, G3 and G4 which drive the cathode gates of the first, second, third and fourth thyristors 340, 342, 344, 346, respectively. The control circuit 360 includes inputs for sensing the voltage at input nodes 324 and 334, and further includes an input for sensing AC current flow using a current sensor 362 coupled to sense current flowing through one of the inductors (in this illustrated case, the inductor 310).

FIG. 3 shows waveforms for the operation of the PFC rectifier circuit 320 in normal mode. There is no difference in operation in comparison to the PFC rectifier circuit 120 in FIG. 2 or PFC rectifier circuit 120' in FIG. 5.

FIGS. 6A and 6B show waveforms for the operation of the PFC rectifier circuit 320 in detecting and responding to a disconnection of an AC input voltage by discharging an AC capacitor. The operation here is basically the same as with the PFC rectifier circuit 120' in FIG. 5, with the following changes:

a) If a disconnection occurs (detected by the control circuit 360 when no zero-cross occurs; or alternatively that there is a DC supply disconnection as discussed above) and the polarity of the voltage across AC capacitor Xcap is positive (i.e., powered off under a positive halfwave with the conventions taken in the drawings), signal M2 is asserted to turn on the second transistor switch 332 and signal G4 is simultaneously asserted to turn on the fourth thyristor 346. The voltage across the AC capacitor Xcap is discharged by a capacitor discharge current that flows from node 300 at the positive terminal of AC capacitor Xcap through inductor 304 to input node 324, then through turned on second transistor switch 332, and then through series connected resistor Ricl2 and turned on fourth thyristor 346 to node 334, and then through inductor 310 to node 302 at the negative terminal of AC capacitor Xcap; and b) if a disconnection occurs (detected by the control circuit 360 when no zero-cross occurs; or alternatively that there is a DC supply disconnection as discussed above) and the polarity of the voltage across AC capacitor Xcap is negative (i.e., powered off under a negative halfwave with the conventions taken in the drawings), signal M1 is asserted to turn on the first transistor switch 322 and signal G3 is simultaneously asserted to turn on the third thyristor 344. The voltage across the AC capacitor Xcap is discharged by a capacitor discharge current that flows from node 302 at the negative terminal of AC capacitor Xcap through inductor 310 to input node 334, then through series connected resistor Ricl1 and turned on third thyristor 344, and then through turned on first transistor switch 322 to node 324, and then through inductor 304 to node 300 at the positive terminal of AC capacitor Xcap.

Thus, the capacitor Xcap discharges using the selectively actuated MOSFET of the totem-pole PFC circuit, its power being discharged by dissipation into the resistances of resistor Ricl1 and actuated thyristor 344 (or resistor Ricl2 and actuated thyristor 446) and possibly the intrinsic resistance of the inductors 304 and 310. Although the resistances are small, they are nonetheless sufficient to discharge capacitor Xcap. In practice, a current flow of a few milliamperes is sufficient to sufficiently rapidly discharge (within from a few milliseconds to a few tens of milliseconds) the capacitor Xcap.

Although the first, second, third and fourth thyristors 340, 342, 344, 346 are shown in FIG. 9 as being cathode-gates devices, the second and fourth thyristors 342 and 346 could instead be anode-gated devices (see, as shown in FIG. 8 with thyristors 142 and 146).

The illustration of the voltage across the capacitor Vcap as shown in FIGS. 4A, 4B, 6A and 6B at the time of the disconnection is a simplification that ignores any current drawn due to continued operation of downstream circuits such as the switching converter 5 (FIG. 1). With the presence of such a connected load, there will be an abrupt decrease (faster than the sinusoidal decrease of voltage Vac) of voltage across the capacitor Xcap at the time td and shortly thereafter until the voltage levels out (reference 192). The subsequent failure to have a zero-cross (for example, within a time period of one or two cycles of AC voltage following the disconnection event; or alternatively that there is a DC supply disconnection as discussed above) is detected by the control circuit 160, 360 and this will trigger performance of the capacitor discharge function.

An advantage of the described embodiments is that their implementation only requires the generation of a specific control of the switching transistors (and perhaps also the thyristors) of a totem-pole PFC circuit in order to provide the AC capacitor discharge function.

An advantage of the described embodiments is that the discharge of the AC capacitor Xcap is particularly simple and uses circuits of low complexity.

Various embodiments and variations have been described. Those skilled in the art will understand that certain features of these various embodiments and variations may be combined, and other variations will occur to those skilled in the art.

Finally, the practical implementation of the described embodiments and variations is within the abilities of those skilled in the art based on the functional indications given hereabove. In particular, the selection of the time period for which voltage Vac has disappeared before the discharge of capacitor Xcap may vary, provided that it is compatible with the maximum time period required to discharge capacitor Xcap, which is generally set by standards. A time period from a few tens of milliseconds to a few seconds is a preferred choice, more preferably in the order of from 40 ms to 2 s.

The invention claimed is:

1. A circuit, comprising:
a first capacitor having first and second electrodes respectively coupled to first and second power supply input nodes;
a first switching transistor having a conduction path coupled between the first power supply input node and a first DC node;
a second switching transistor having a conduction path coupled between the first power supply input node and a second DC node;

a first thyristor having a conduction path coupled between the second power supply input node and the first DC node;

a second thyristor having a conduction path coupled between the second power supply input node and the second DC node;

a resistor coupled between the second power supply input node and an intermediate node;

a first diode having a conduction path coupled between the intermediate node and the first DC node;

a second diode having a conduction path coupled between the intermediate node and the second DC node; and a control circuit configured to sense a disconnection of input power to the first and second power supply input nodes and in response thereto turn on one of the first and second switching transistors to discharge the first capacitor through the resistor.

2. The circuit of claim 1, wherein sensing disconnection comprises sensing by the control circuit of a certain condition with respect to a voltage between the first and second power supply input nodes within a time period.

3. The circuit of claim 1, wherein sensing disconnection is achieved by delaying turn on of one of the first and second switching transistors repetitively for a time period.

4. The circuit of claim 1, wherein the first and second thyristors are cathode-gate devices.

5. The circuit of claim 1, wherein the one of the first and second thyristors is a cathode-gate device and another of the first and second thyristors is an anode-gate device.

6. The circuit of claim 1, wherein the first and second switching transistors are MOSFETs.

7. The circuit of claim 1, wherein the control circuit is further configured to selectively turn on one of the first and second thyristors in a normal operational mode for producing a rectified DC voltage across the first and second DC nodes.

8. The circuit of claim 7, wherein the control circuit is further configured to apply a pulsed control signal to one the first and second switching transistors in the normal operational mode while said one of the first and second thyristors is selectively turned on.

9. The circuit of claim 8, wherein the pulsed control signal is pulse width modulated.

10. The circuit of claim 8, wherein said one of the first and second switching transistors which is selectively turned on to discharge the first capacitor is dependent on a sign of the input power.

11. The circuit of claim 1, wherein the control circuit senses the disconnection of the input power if an AC voltage between the first and second power supply input nodes for the input power fails to zero-cross within a time period.

12. The circuit of claim 11, wherein the time period is a range from one period of the AC voltage to a few periods of the AC voltage.

13. The circuit of claim 1, wherein the control circuit senses the disconnection of the input power if a voltage between the first and second power supply input nodes decreases within a time period when one of the first and second switching transistors is turned on.

14. The circuit of claim 1, wherein the control circuit senses the disconnection of the input power if a sensed current does not increase to a certain degree within a time period when one of the first and second switching transistors is turned on.

15. The circuit of claim 1, further comprising an inductor coupled between the first power supply input node and a node at a series coupling of the first and second switching transistors.

* * * * *

UNITED STATES PATENT AND TRADEMARK OFFICE
CERTIFICATE OF CORRECTION

PATENT NO. : 11,228,239 B2  
APPLICATION NO. : 16/858907  
DATED : January 18, 2022  
INVENTOR(S) : Ghafour Benabdelaziz et al.

Page 1 of 1

It is certified that error appears in the above-identified patent and that said Letters Patent is hereby corrected as shown below:

In the Specification

At Column 4, Line 49, please replace the term [[ Rid ]] with -- Ricl --.

At Column 7, Line 60, please replace the term [[ Rid ]] with -- Ricl --.

At Column 8, Line 12, please replace the term [[ Rid ]] with -- Ricl --.

At Column 9, Line 27, please replace the term [[ Rid ]] with -- Ricl --.

At Column 9, Line 66, please replace the term [[ Rid ]] with -- Ricl --.

At Column 10, Line 19, please replace the term [[ Rid ]] with -- Ricl --.

Signed and Sealed this  
Twenty-ninth Day of November, 2022

Katherine Kelly Vidal  
*Director of the United States Patent and Trademark Office*